(12) United States Patent
Matsuzaki et al.

(10) Patent No.: US 11,732,912 B2
(45) Date of Patent: Aug. 22, 2023

(54) CLEAN BOOTH

(71) Applicants: Hitachi Global Life Solutions, Inc., Tokyo (JP); Shanghai Rorze Remed Biotechnology Co., Ltd., Shanghai (CN); Rorze Lifescience, Inc., Tukuba (JP)

(72) Inventors: Kazuhito Matsuzaki, Tokyo (JP); Yuuiti Sato, Tokyo (JP); Noritoshi Nishimura, Tokyo (JP); Nobuhiro Imaguchi, Tokyo (JP); Fuyue Wu, Shanghai (CN); Wenbo Qu, Shanghai (CN); Yukito Yamasaki, Ibaraki (JP)

(73) Assignees: Hitachi Global Life Solutions, Inc., Tokyo (JP); Shanghai Rorze Remed Biotechnology Co., Ltd., Shanghai (CN); RORZE Lifescience, Inc., Tsukuba (JP)

( * ) Notice: Subject to any disclaimer, the term of this patent is extended or adjusted under 35 U.S.C. 154(b) by 121 days.

(21) Appl. No.: 17/428,503

(22) PCT Filed: Apr. 21, 2020

(86) PCT No.: PCT/JP2020/017261
§ 371 (c)(1),
(2) Date: Aug. 4, 2021

(87) PCT Pub. No.: WO2021/214892
PCT Pub. Date: Oct. 28, 2021

(65) Prior Publication Data
US 2022/0316724 A1    Oct. 6, 2022

(51) Int. Cl.
*F24F 7/003* (2021.01)
*B01L 1/04* (2006.01)
*F24F 7/013* (2006.01)
*A61G 10/02* (2006.01)

(52) U.S. Cl.
CPC .............. *F24F 7/003* (2021.01); *B01L 1/04* (2013.01); *F24F 7/013* (2013.01); *A61G 10/02* (2013.01)

(58) Field of Classification Search
CPC ............ F24F 7/003; F24F 7/013; F24F 3/167; B01L 1/04; B01L 1/52; A61G 10/02; A61G 10/023; Y02B 30/70
See application file for complete search history.

(56) References Cited

FOREIGN PATENT DOCUMENTS

| CN | 106642432 A | * | 5/2017 | ......... B01D 46/2451 |
| CN | 206410261 U |   | 8/2017 | |
| JP | 2005-326093 A |   | 11/2005 | |
| JP | 3797725 B2 | * | 7/2006 | |

(Continued)

OTHER PUBLICATIONS

English translation CN-106642432-A Chen (Year: 2017).*

(Continued)

*Primary Examiner* — Jessica Yuen
(74) *Attorney, Agent, or Firm* — Crowell & Moring LLP

(57) ABSTRACT

Provided is a clean booth in an assembled state, including: a frame; a wall portion that is provided on the frame and forms an internal space; a first unit that is provided on the wall portion and includes a first fan that supplies air to the internal space via a first filter; and a second unit that is provided on the wall portion and includes a second fan that exhausts the air in the internal space.

3 Claims, 6 Drawing Sheets

(56) References Cited

FOREIGN PATENT DOCUMENTS

| JP | 4632806 B2 | * | 2/2011 | ............ C12M 37/00 |
| JP | 2011-231989 A | | 11/2011 | |
| JP | 2011-234929 A | | 11/2011 | |
| JP | 2015168465 A | * | 9/2015 | |

OTHER PUBLICATIONS

English translation JP-4632806-B2 Hirai (Year: 2011).*
English translation JP-3797725-B2 Inamura (Year: 2006).*
English translation JP-2015168465-A Imai (Year: 2015).*
International Search Report (PCT/ISA/210) issued in PCT Application No. PCT/JP2020/017261 dated Jun. 23, 2020 (three (3) pages).
Japanese-language Written Opinion (PCT/ISA/237) issued in PCT Application No. PCT/JP2020/017261 dated Jun. 23, 2020 (seven (7) pages).
Japanese-language Office Action issued in Japanese Application No. 2020-533305 dated Aug. 4, 2020 with English translation (11 pages).

* cited by examiner

[FIG. 1]
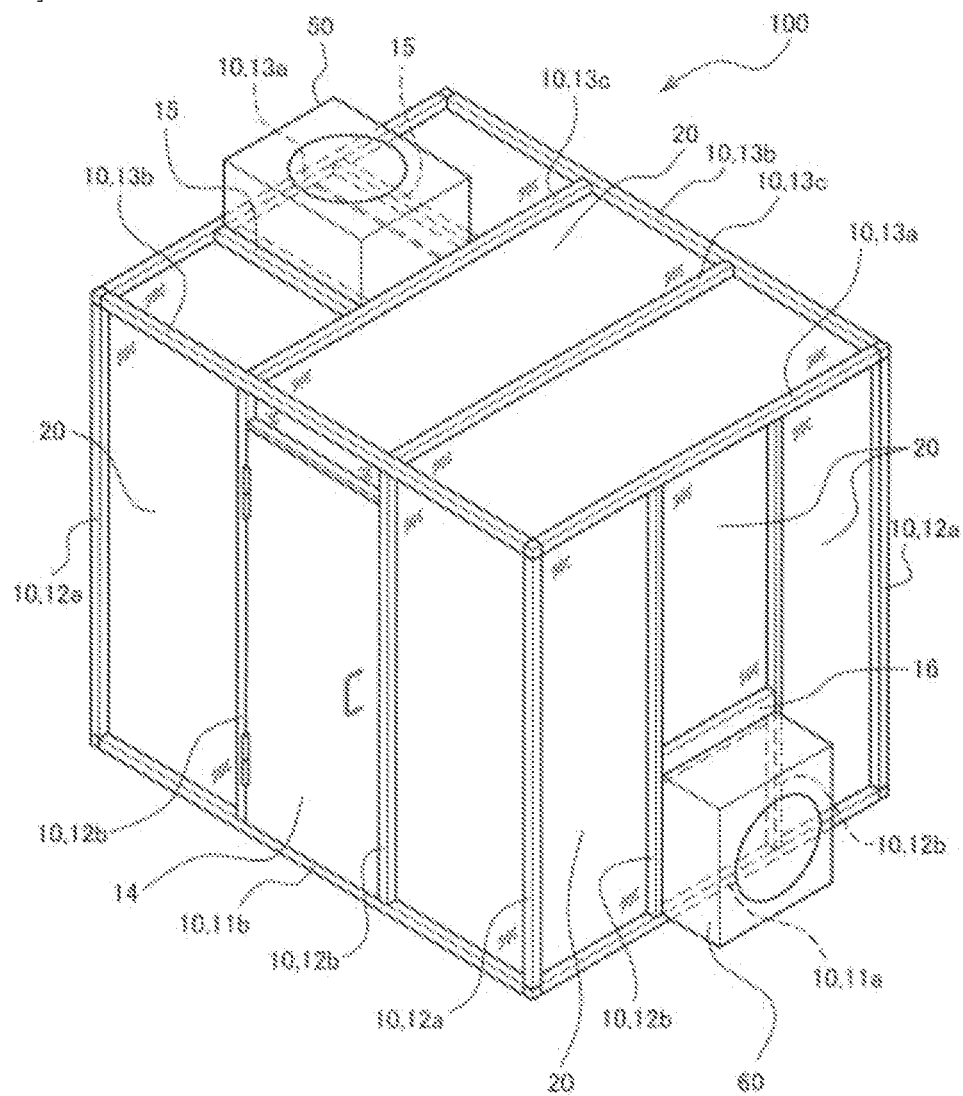

[FIG. 2]
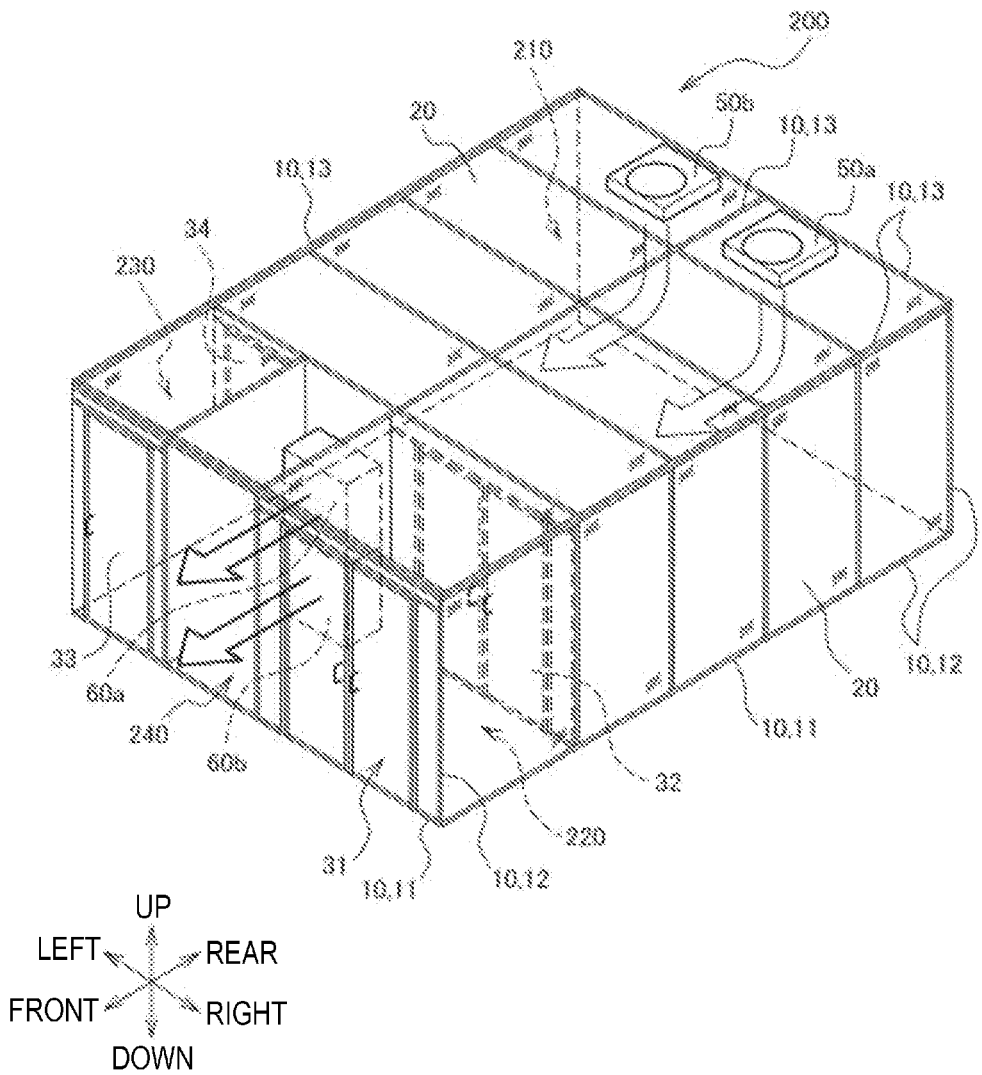

[FIG. 3A]
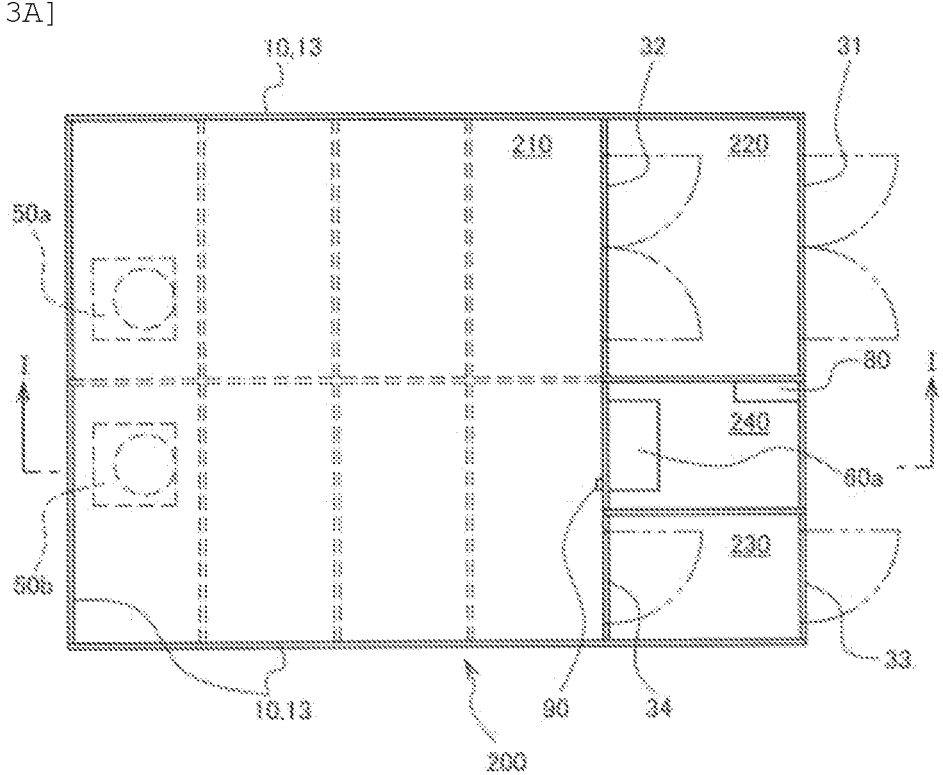
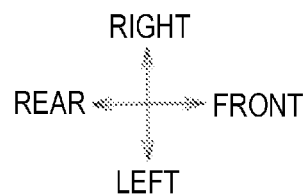

[FIG. 3B]
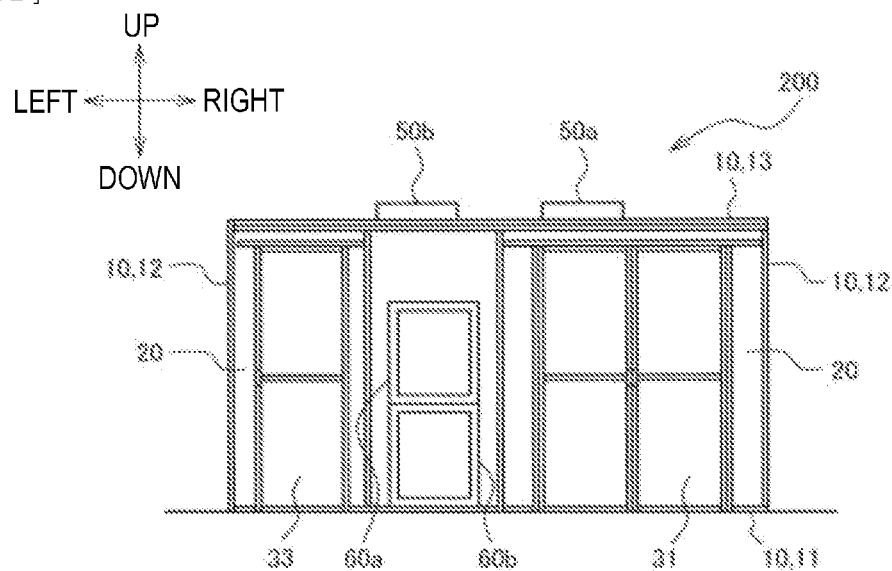
[FIG. 3C]
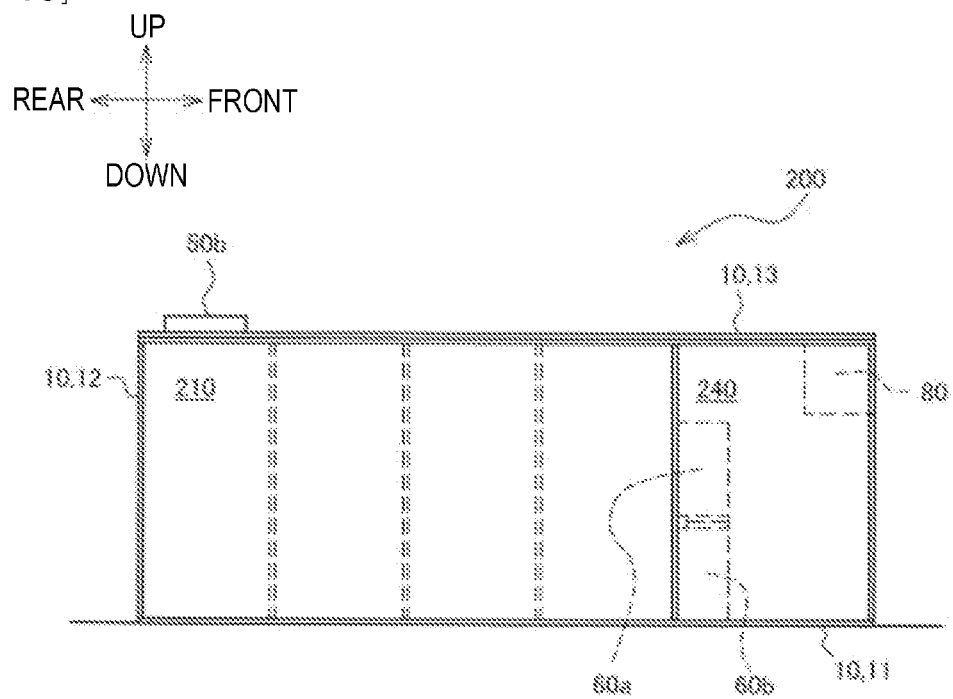

[FIG. 4]
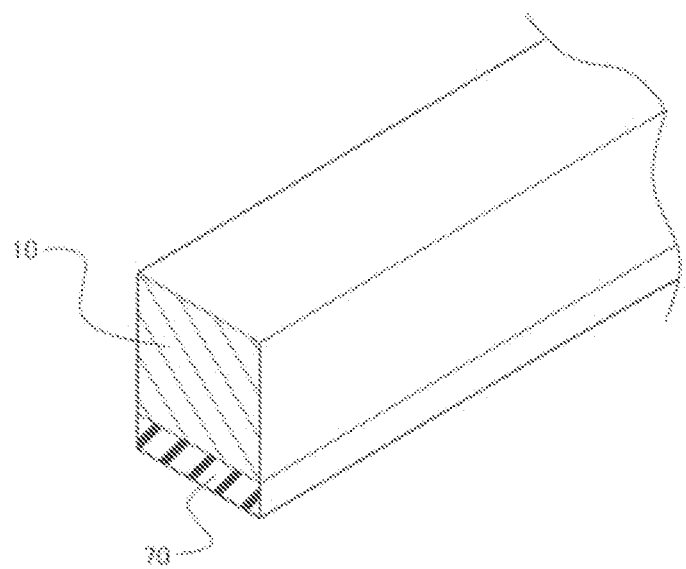
[FIG. 5]
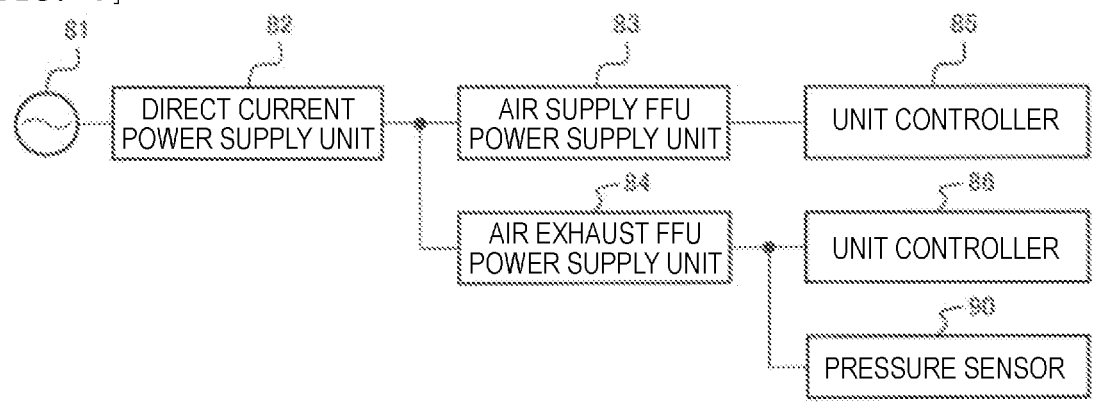

[FIG. 6]
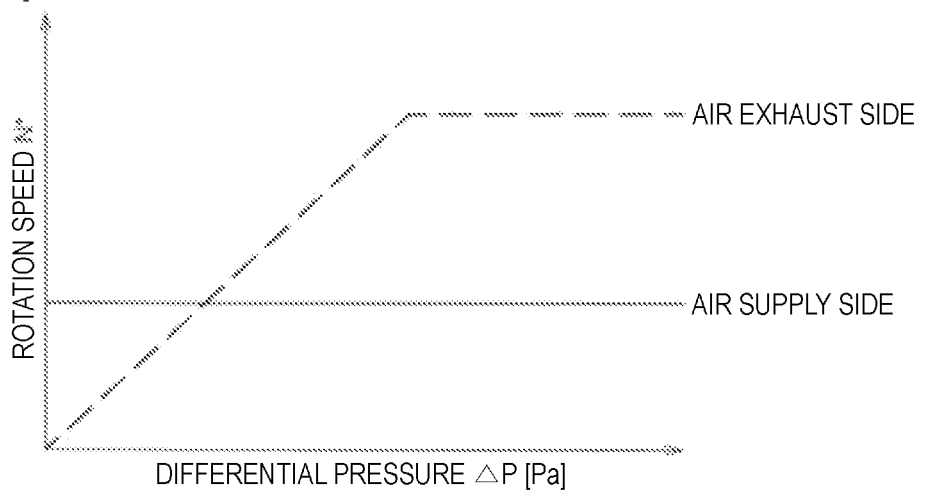

CLEAN BOOTH

TECHNICAL FIELD

The present invention relates to an assembly-type clean booth that can be assembled and disassembled.

BACKGROUND ART

In the medical field, the industrial field, and the field of physics and chemistry, clean rooms are used to ensure the cleanliness of air. In a case of a therapy of a patient who has reduced resistance, or the like, or manufacturing pharmaceuticals, semiconductors, or the like, in order to prevent the invasion of contaminants, a clean room of the positive pressure chamber is used. In a case of treatment or therapy of an affected person of an infectious disease, or handling of pathogens, genetic recombinants, radioactive substances, or the like, in order to prevent the leakage of dangerous substances, a clean room of the negative pressure chamber is used.

In the related art, as a facility that easily realizes such a space, an assembly-type clean booth is known. The assembly-type clean booth is configured with a frame that forms a skeleton of a main body and encloses an internal space in an assembled state, a screen that closes a portion between the frames and separates an internal space and an external space, and the like. The assembly-type clean booth is assembled when in use and disassembled when not in use, and thus is provided to be lightweight and in a simple structure.

In many cases, the assembly-type clean booth includes a blower fan. As a blowing method, a one-pass method in which only the air supply is performed on an internal space is widely used. In the one-pass method, the air outside the booth is supplied to the internal space via a dust-proof filter, and the air flows in one direction in the internal space for air exhaust. In the assembly-type clean booth, easiness of the conveyance, assembly, and disassembly is required, and thus a positive pressure-type one-pass method in which the air is exhausted without change from the bottom side via no dust-proof filter or fan in the air exhaust is spread.

PTL 1 discloses an assembly-type clean booth provided with both of an air supply fan and an air exhaust fan. As the air supply fan and the air exhaust fan, a commercially available ventilation fan or the like can be used (see paragraph 0065). It is also disclosed that the room can be adjusted to positive or negative pressure simply by controlling the ON/OFF of the blower (see paragraph 0071). It is disclosed that the HEPA filter is installed on the air supply side when the pressure inside the room is set to positive, and on the air exhaust side when the pressure inside the room is set to negative (see paragraph 0074).

CITATION LIST

Patent Literature

PTL 1: JP-A-2011-231989

SUMMARY OF INVENTION

Technical Problem

In various fields such as the medical field, it is required to perform works and acts that require the cleanliness of the air in an assembly-type clean booth while the external contamination is avoided. In the related art, the works and acts that require the cleanliness of the air are generally performed in a positive pressure chamber. However, there are cases where contaminants that should be prevented from leaking are potentially contained in the internal space where works and acts are performed or contaminants are generated according to the works and acts.

When the clean booth is a positive pressure chamber, it can be said that such contaminants are likely to diffuse outside the booth. If the assembly-type clean booth has a structure in which contaminants easily leak to the outside, the installation location and installation conditions are restricted, and thus it is a problem that the advantages of the assembly type are lost.

For example, when the treatment or the therapy of an affected person of an infectious disease or the like is performed, it is desirable to prevent the leakage of the pathogens to the outside, and thus the negative pressure chamber is generally effective. Meanwhile, there is a risk that medical personnel engaged in the treatment and the therapy is infected in the booth, and thus it is desirable to secure the cleanliness of the air in the booth.

When the treatment and the therapy of the affected person of the infectious disease or the like are performed, it is assumed that the number of hospital rooms may be insufficient, and thus an assembly-type clean booth may be installed in an appropriate location such as indoor of a medical facility. However, it is assumed that there are patients, medical personnel, and the like who should avoid infection in the space where the assembly-type clean booth is installed.

The technology described in PTL 1 has a problem in that a HEPA filter is installed on any one of the air supply side or the air exhaust side, and thus both of the cleanliness of the air inside the booth and the suppression of the contamination outside the booth cannot be achieved. Therefore, an assembly-type clean booth where the cleanliness of the air in the booth is secured, and the contamination outside the booth is also suppressed is desired.

Therefore, an object of the present invention is to provide an assembly-type clean booth that easily forms a space where the cleanliness of the air is secured, and external contamination is also suppressed.

In order to achieve the object, according to the present invention, a clean booth in an assembled state, includes: a frame; a wall portion that is provided on the frame and forms an internal space; a first unit that is provided on the wall portion and includes a first fan that supplies air to the internal space via a first filter; and a second unit that is provided on the wall portion and includes a second fan that exhausts the air in the internal space outside the internal space via a second filter.

Advantageous Effects of Invention

According to the present invention, it is possible to provide an assembly-type clean booth that can easily form a space where the cleanliness of the air is secured, and external contamination is also suppressed.

BRIEF DESCRIPTION OF DRAWINGS

FIG. 1 is a perspective view illustrating an appearance of a clean booth according to an embodiment of the present invention.

FIG. 2 is a perspective view illustrating an appearance of the clean booth according to one embodiment of the present invention.

FIG. 3A is a cross-sectional plan view of the clean booth of FIG. 2.

FIG. 3B is a front view of the clean booth of FIG. 2.

FIG. 3C is a cross-sectional side view of the clean booth of FIG. 2.

FIG. 4 is a cross-sectional perspective view illustrating an example of the structure of a lower end of the clean booth.

FIG. 5 is a block diagram illustrating an example of a configuration of a power supply of the clean booth.

FIG. 6 is a diagram illustrating a relationship between a rotational speed of a fan of a fan filter unit and differential pressure formed by the fan.

DESCRIPTION OF EMBODIMENTS

Hereinafter, a clean booth according to an embodiment of the present invention will be described with reference to the drawings. In each drawing, the same configuration is denoted by the same reference numeral, and duplicate description is omitted.

FIG. 1 is a perspective view illustrating an appearance of the clean booth according to an embodiment of the present invention. FIG. 1 illustrates a state of an example of an assembly-type clean booth is assembled in a top view from above.

As illustrated in FIG. 1, the clean booth 100 includes frames 10 that form a skeleton of a booth main body in an assembled state and wall portions 20 that form an internal space provided in the frames 10.

The booth main body of the clean booth 100 is configured with a combination of the plurality of frames 10 and the plurality of wall portions 20. The clean booth 100 has an internal space inside the booth main body which is separated from an external space.

FIG. 1 illustrates a state in which fan filter units (FFU) 50 and 60 are assembled to the assembled booth main body of the clean booth 100.

The clean booth 100 is to provide an internal space which is separated from the external space and in which the cleanliness of the air is secured as a negative pressure chamber having the pressure lower than the external space. As illustrated in FIG. 1, the clean booth 100 is used as an assembled state. When not in use, the clean booth 100 can be disassembled and can be stored in a disassembled state.

In the assembled state, the pressure of the internal space (room pressure) of the clean booth 100 is adjusted to negative pressure which is lower than the pressure of the external space by a fan filter unit described below. In the assembled state, the cleanliness of the air in the internal space is adjusted to a state of being higher than that of the external space by the fan filter unit described below. That is, a negative pressure chamber in which the number of dust particles of equal to or more than a predetermined size or the like is smaller than that in the external space is formed.

The internal space of the clean booth 100 is used for a work or an act that requires the cleanliness of the air. Examples of the work or the act that requires the cleanliness of the air include a treatment or a therapy of an affected person of an infectious disease or the like and an examination, isolation, or checkup of a patient. Here, the work or the act performed in the internal space is not limited to works or acts performed in the medical field, but examples thereof may include works in the industrial field such as manufacturing of pharmaceuticals, semiconductors, or the like, or works in the field of physics and chemistry including handling of pathogens, genetically modified substances, radioactive substances, and the like.

In FIG. 1, the clean booth 100 is provided to exhibit a substantially cubic hexahedron in the assembled state. Here, the booth main body of the clean booth 100 is open on the bottom side and has a ceiling portion and a side portion, but does not have a bottom portion. On the bottom side of the booth main body, a floor, a ground, or the like of a location where the clean booth 100 is assembled separates the internal space.

According to the structure using the ground surface of the assembled location, the bottom portion is not required to be assembled, and thus the booth main body can be promptly assembled. Since the member that forms a bottom portion is not required, the weight of the entire member that configures the booth main body can be reduced.

In FIG. 1, the clean booth 100 has one chamber inside the booth main body as an internal space where the room pressure or the cleanliness of the air is adjusted. The booth main body of the clean booth 100 is formed by combining the plurality of frames 10 and is mainly completed by bases, pillars, and beams.

The frames 10 are preferably provided as linear pillar-like members. If the frames 10 are pillar-like members, in a state before the clean booth 100 is assembled, the clean booth 100 can be easily conveyed. The space for storing the members that configure the booth main body can be saved.

Examples of the material of the frame 10 include an aluminum alloy such as an Al—Mg—Si alloy, carbon steel, stainless steel, or a synthetic resin. The material of the frame 10 is preferably an aluminum alloy. As the aluminum alloy, the frame can be provided with a light weight, and thus the booth main body can be easily assembled or disassembled. The width and the thickness of the frame 10 are not particularly limited, but may be, for example, 30 to 50 mm.

In FIG. 1, the frames 10 of the base include two vertical base members 11a disposed in parallel to each other and horizontal base members 11b disposed in parallel to each other to be orthogonal to the vertical base members 11a. Among these members, FIG. 1 shows members positioned on the front side and the right side of the booth main body.

The frames 10 of the pillars include four pillar members 12a standing at the four corners of the base and eight column members 12b standing between the pillar members 12a. Among these members, FIG. 1 shows members positioned on the front side and the right side of the booth main body.

The frames 10 of the beams include two vertical beam members 13a disposed in parallel to each other, two horizontal beam members 13b disposed in parallel to each other to be orthogonal to the vertical beam members 13a, and two intermediate beam members 13c mounted in parallel between the vertical beam members 13a.

The vertical base members 11a and the horizontal base members 11b form a skeleton of a bottom portion of the booth main body. The vertical beam members 13a and the horizontal beam members 13b form a skeleton of the ceiling portion of the booth main body. The pillar members 12a form a skeleton of the side portion of the booth main body together with the vertical base members 11a, the horizontal base members 11b, the vertical beam members 13a, and the horizontal beam members 13b.

The column members 12b are disposed at a position where the side portion of the booth main body is divided into approximately three equal parts. The vertical beam members 13a or the horizontal beam members 13b are supported in the vertical direction by the pillar members 12a or the column members 12b. The intermediate beam members 13c are disposed at a position where the ceiling portion of the booth main body is divided into approximately three equal parts. The horizontal beam members 13b are supported in the horizontal direction by the vertical beam members 13a or the intermediate beam members 13c. According to the structure, the strength or the rigidity of the booth main body is enhanced.

As illustrated in FIG. 1, the ceiling portion of the booth main body includes unit support members 15. As the unit support members 15, two pillar-like members provided with thin plate-like receiving surfaces are incorporated. Each of the unit support members 15 is fixed in a state of being mounted in parallel to each other between one vertical beam member 13a positioned on the left side of the booth main body and the intermediate beam member 13c adjacent to the vertical beam member 13a and unevenly distributed on one side of the ceiling portion of the booth main body.

The unit support members 15 become portions for placing and fixing an air supply fan filter unit (first unit) 50. In order to secure close contact and airtightness, packing (not illustrated) is attached to receiving surfaces of the unit support members 15. As the packing, a synthetic resin material having elasticity, low gas permeability, and the like are used.

In the assembled state of the clean booth 100, the air supply fan filter unit 50 is fixed to the upper surfaces of the unit support members 15 so that the discharge side faces downward. An opening portion formed between the unit support members 15 is airtightly closed by the fan filter unit 50 and the packing.

As illustrated in FIG. 1, one side portion positioned on the right side of the booth main body includes a unit connection member 16. The unit connection member 16 includes a pillar-like member provided with a thin plate-like adhesion margin. The unit connection member 16 is fixed in a state of being horizontally mounted between two of the column members 12b disposed on the side portion of the booth main body and unevenly distributed on the lower side of the side portion of the booth main body.

The unit connection member 16 becomes a portion for adhering and fixing the air exhaust fan filter unit (second unit) 60. Packing (not illustrated) is attached to the adhesion margin of the unit connection member 16 for securing the close contact and the airtightness. As the packing, a synthetic resin material having elasticity, low gas permeability, and the like is used.

In the assembled state of the clean booth 100, the fan filter unit 60 is fixed to the outside of the unit connection member 16 so that the suction side faces inward. The opening portion formed on the unit connection member 16 is airtightly closed by the fan filter unit 60 and the packing.

The receiving surface or the packing can be also provided to the vertical beam members 13a or the intermediate beam members 13c in the same manner as to the unit support members 15. The adhesion margin or the packing can be also provided to the column members 12b or the vertical base members 11a in the same manner as to the connection member 16. The packing can be also stuck to the fan filter units 50 and 60 according to the shape of the opening portion. The fan filter units 50 and 60 are almost diagonally disposed when viewed from the front of the clean booth 100, and thus the clean booth 100 does not easily fall down.

When the clean booth 100 is installed, the vertical base members 11a, the horizontal base members 11b, the pillar members 12a, the column members 12b, the vertical beam members 13a, the horizontal beam members 13b, the intermediate beam members 13c, the unit support members 15, and the unit connection member 16 can be assembled with each other and fixed to each other with bolts, nuts, and the like. In order to fix the fan filter units 50 and 60, a fixing portion or the like that can be screwed with the bolts may be provided to the unit support members 15 or the unit connection member 16.

As illustrated in FIG. 1, in order to allow entry and exit from the internal space, the side portion of the booth main body includes a door 14 that can be opened and closed. In FIG. 1, the door 14 is disposed between two column members 12b in the side portion of the front side of the booth main body. The door 14 is provided in a width capable of closing the opening portion formed between the column members 12b.

The door 14 can be provided in a panel shape or the like, for example, by a synthetic resin material such as an acrylic resin, a lightweight metal material, or the like. The door 14 is provided as an external opening hinged door. The sealability of the internal space can be supplemented by an external opening method in which the internal space is easily closed by the negative pressure.

The method of attaching the door 14 can be, for example, a method using an inserting-type hinge. A pair of hinges configured with a shaft side hinge and a hole side hinge are fixed to the door 14 and one column member 12b adjacent to the door 14, respectively. In this method, the door 14 can be assembled simply by inserting a hinge of the door 14 into a hinge of the frame 10. The door 14 can be removed simply by lifting the door 14 that is assembled.

As described above, the booth main body of the clean booth 100 includes a portion to which the door 14 is attached, a portion to which the air supply fan filter unit 50 is attached, and a portion to which the air exhaust fan filter unit 60 is attached, as main opening portions. These opening portions become main ventilation paths and allow air to be supplied to the internal space or to be exhausted from the internal space.

Except for these opening portions and the bottom side of the booth main body, the wall portions 20 are provided between the frames 10 assembled with each other or the like. The wall portions 20 are formed by screens. The portions except for the opening portions of the booth main body, the airtightness between the internal space and the external space is secured by the wall portions 20 formed with screens. Except for these portions, minute opening portions are formed for wiring of electrical equipment, wiring of communication lines, or the like. However, the minute opening portions are closed by a seal material. As the seal material, tape formed with a synthetic resin such as a vinyl chloride resin or the like is used.

The screen for forming the wall portion 20 may have a sheet shape having flexibility or may have a panel shape having rigidity, but is preferably a sheet shape. As the material of the screen, for example, a synthetic resin such as a vinyl chloride resin can be used. The thickness of the screen in the sheet shape can be, for example, 0.3 to 2.0 mm. The screen can be provided with appropriate light transmission. For example, the screen may be transparent, semi-transparent, or opaque.

The screen forming the wall portion 20 can be detachable from the frames 10. Hook and loop fasteners formed with processed fiber are stuck to outer edge portions of one surface of the screen and surfaces of the frames 10, respectively. According to this method, the screen can be attached to and removed from the frames 10, and when not in use, the screens that form the frames 10 and the wall portions 20 are conveyed and stored in a disassembled state. If the screens that form the wall portions 20 are sheet shape having flexibility, the wall portions 20 can be conveyed and stored in a folded state or a rolled state.

As illustrated in FIG. 1, in the assembled state, the clean booth 100 includes the air supply fan filter unit (first unit) 50 and the air exhaust fan filter unit (second unit) 60 on the wall portions 20 that form the internal space.

The fan filter units (FFU) 50 and 60 are devices that inhale gas, remove dust particles or the like from the inhaled gas, and blow the gas (gas from which the number of dust particles or the like of equal to or more than a predetermined size or the like are reduced) of which the cleanliness is enhanced. The fan filter units 50 and 60 include filters that remove dust particles or the like from passing gas, fans that blow gas for supplying or exhausting the air, control devices that control the rotation speed of the fan, or the like.

In order to collect particles such as dust particles, the filter of the FFU is configured with a flow path of the air, a separator that is installed in the flow path and changes the flow path, a filter material of fiber or the like, and the like. As the filter, a dust-proof filter such as High efficiency particulate air (HEPA) filter or ultra low penetration air (ULPA) filter is used.

The fan of the FFU is configured with a fan main body such as a rotatable impeller and a fan motor that drives the rotational movement of the fan main body. As the fan, for example, an axial fan such as a propeller fan is used. As the fan motor, a direct current motor, an induction motor, and the like are used. As the direct current motor, either of a brushless direct current motor and a brushed direct current motor can be used.

The air supply fan filter unit (first unit) 50 includes a fan (first fan) that supplies the air into the internal space of the booth main body via a built-in filter (first filter). The fan filter unit 50 inhales the external air of the clean booth 100 and discharges the air passing through the filter to the internal space of the booth main body.

The air exhaust fan filter unit (second unit) 60 includes a fan (second fan) that exhausts the air in the internal space of the booth main body out of the internal space of the booth main body via a built-in filter (second filter). The fan filter unit 60 inhales the air in the internal space of the booth main body and discharges the air passing through the filter to the outside of the clean booth 100.

In the clean booth 100, the exhaust air volume by the air exhaust fan filter unit 60 is controlled to be more than the air supply flow rate by the air supply fan filter unit 50. By the control, the pressure of the internal space (room pressure) is adjusted to the negative pressure which is lower than the pressure of the external space. The pressure value of the internal space is not particularly limited, as long as the pressure value is lower than the pressure of the external space.

One preferable control method of the rotation speed of the fan is a method of controlling both of the rotation speed of the fan on the air supply side and the rotation speed of the fan on the air exhaust side to constant speeds. As the fan motors on the air supply side and the air exhaust side, any one of the brushed direct current motor or the induction motor can be used.

In such a control method, the air supply fan filter unit 50 and the air exhaust fan filter unit 60 are preferably provided in the switch type in which the rotation speed switches per air flow rate so that the rotation speed of the fan changes stepwise to a different rotation speed according to the size of the negative pressure required for the internal space. The rotation speeds of the fans on the air supply side and the air exhaust side can be set in advance for each switching stage.

According to the control method, since both of the rotation speed of the fan on the air supply side and the rotation speed of the fan on the air exhaust side are controlled to the constant speed, the pressure of the internal space can be adjusted to a specific negative pressure by switching the rotation speeds of the fans on the air supply side and the air exhaust side according to the size of the negative pressure required for the internal space. Since the pressure of the internal space is easily stabilized, the risk that the internal space becomes the positive pressure can be reduced.

Another preferable method of controlling the rotation speed of the fan is a method of controlling the rotation speed of the fan on the air supply side to a constant speed and controlling the rotation speed of the fan on the air exhaust side to a variable speed. As the fan motor on the air supply side, any one of the brushed direct current motor or the induction motor can be used. As the fan motor on the air exhaust side, any one of the brushless direct current motor and the induction motor can be used.

In such a control method, the air supply fan filter unit 50 is preferably provided in a switch type in which the rotation speed switches per air flow rate so that the rotation speed of the fan changes stepwise to a different rotation speed according to the size of the negative pressure required for the internal space. Meanwhile, the air exhaust fan filter unit 60 controls the rotation speed of the fan at a variable speed by an inverter. The rotation speed of the fan on the air exhaust side is preferably feedback controlled based on the measurement of the room pressure by a pressure sensor 90 to control the room pressure of the internal space to a target value.

According to the control method, since the rotation speed of the fan on the air supply side is controlled to the constant speed and the rotation speed of the fan on the air exhaust side is controlled to the variable speed, when the negative pressure formed in the internal space becomes the target value, only the rotation speed of the fan on the air exhaust side is controlled to the variable speed, and thus the occurrence of the hunting phenomenon can be prevented. Generally, if both of the fan on the air supply side and the fan on the air exhaust side are set to the variable speed, periodic fluctuations occur due to the hunting phenomenon, and it becomes difficult to stabilize the room pressure. In such a control method, the negative pressure formed in the internal space is controlled to the target value, and the risk that the internal space becomes the positive pressure can be reduced.

As illustrated, the air supply fan filter unit 50 is preferably disposed on the ceiling portion of the booth main body or the upper side of the side portion of the booth main body. Meanwhile, as illustrated, the air exhaust fan filter unit 60 is preferably disposed on the lower side of the side portion of the booth main body.

In such disposition, the air flows in one direction from the upper side to the lower side in the booth main body. Therefore, while flying up of the dust particles, dangerous substances, contaminants, or the like is suppressed, the room pressure can be adjusted, and the air can be cleaned. The booth main body has a structure in which the bottom side is opened, but if the air flows in one direction from the upper side to the lower side in the booth main body, the intrusion of the dust particles from the external space to the internal space can be suppressed.

According to the clean booth 100 described above, the air supply fan filter unit 50 including a filter and a fan and the air exhaust fan filter unit 60 including a filter and a fan can be easily attached to the assembly-type booth main body. Since the air blows on the air supply side and the air exhaust side via the filters, not only the cleanliness of the air in the booth is secured, but also the leakage of the contaminants to the outside of the booth can be prevented. Since the fans are provided on both of the air supply side and the air exhaust side, highly accurate negative pressure can be stably maintained by controlling these fans and forming a large differential pressure. The assembly-type booth main body is easily conveyed, assembled, and disassembled. With such a clean booth, a space in which the cleanliness is secured and external contamination is suppressed can be easily formed.

Next, another embodiment of the clean booth according to the present invention is described with reference to the drawings.

FIG. 2 is a perspective view illustrating an appearance of the clean booth according to the embodiment of the present invention. FIG. 3A is a cross-sectional plan view of the clean booth of FIG. 2. FIG. 3B is a front view of the clean booth of FIG. 2. FIG. 3C is a cross-sectional side view of the clean booth of FIG. 2. FIG. 2 illustrates an assembled state of an example of the assembly-type clean booth viewed from the above. FIG. 3C is a cross-sectional view taken along line I-I in FIG. 3A.

As illustrated in FIGS. 2, 3A, 3B, and 3C, in the same manner as in the clean booth 100, the clean booth 200 includes the frames 10 that form a skeleton of the booth main body in the assembled state and the wall portions 20 that are provided on the frames 10 and form an internal space.

In the same manner as in the clean booth 100, the booth main body of the clean booth 200 is configured with a combination of the plurality of frames 10 and the plurality of wall portions 20. The clean booth 200 has an internal space separated from the external space inside the booth main body.

FIGS. 2, 3A, 3B, and 3C illustrate a state in which two air supply fan filter units 50a and 50b and two air exhaust fan filter units 60a and 60b are assembled to the booth main body of an assembled clean booth 200.

The clean booth 200 is to provide an internal space which is separated from the external space and in which the cleanliness of the air is secured as a negative pressure chamber having a lower pressure than the external space. The clean booth 200 is used in an assembled state as illustrated in FIGS. 2, 3A, 3B, and 3C. When not in use, the clean booth 200 can be disassembled and can be stored in a disassembled state.

In the same manner as the clean booth 100, the clean booth 200 is formed by using a plurality of base members 11 as the frames 10 of the base, a plurality of pillar members 12 as the frames 10 of the pillars, and a plurality of vertical beam members 13 as the frames 10 of the beams. The basic configuration such as the frames 10 and the wall portions 20 is the same as those in the clean booth 100.

In the same manner as in the clean booth 100, the clean booth 200 has a main room 210 as an internal space where the room pressure or the cleanliness of the air is adjusted. Meanwhile, the clean booth 200 is different from the clean booth 100 and has a plurality of chambers inside the booth main body. In addition to the main room 210, the clean booth 200 has a front room 220, a sub front room 230, and a machine room 240.

The main room 210 is the largest room inside the booth main body and provided on the rear side of the booth main body. The front room 220 is a room smaller than the main room 210 and is provided on the front side of the main room 210 and on the right side of the booth main body. The sub front room 220 is a room smaller than the main room 210 or the front room 220 and is provided on the front side of the main room 210 and on the left side of the booth main body.

The main room 210, the front room 220, and the sub front room 230 are separated from the outside of the clean booth 200 by the wall portions 20 formed with detachable screens. The main room 210, the front room 220, and the sub front room 230 are separated from each other by the wall portions 20 formed with detachable screens.

The machine room 240 is provided on the front side of the main room 210 and between the front room 220 and the sub front room 230. The machine room 240 is separated from the main room 210, the front room 220, and the sub front room 230 by the wall portions 20 formed with detachable screens. Here, the machine room 240 is divided inside the booth main body, but a portion of the side portions is not separated by the wall portion 20 and open to the outside of the clean booth 200.

The pressure (room pressure) of the internal space of the main room 210 is adjusted by the fan filter unit (FFU) to the negative pressure lower than that of the outside of the clean booth 200, the front room 220, or the sub front room 230. The cleanliness of the air of the main room 210 is adjusted by the fan filter unit (FFU) to be in a state higher than that of the outside of the clean booth 200, the front room 220, or the sub front room 230.

Meanwhile, the front room 220 and the sub front room 230 are not rooms where the pressure or the cleanliness of the air of the internal space is actively adjusted. In the front room 220 or the sub front room 230, the airtightness is secured, but the pressure or the cleanliness of the air of the internal space depends on the air flowing from the main room 210.

The main room 210 is used in the work or the act in which the cleanliness of the air is required. Examples of the work or the act in which the cleanliness of the air is required include a treatment or a therapy of an affected person of an infectious disease or the like and an examination, isolation, or checkup of a patient. Here, the work or the act performed in the internal space is not limited to works or acts performed in the medical field, but examples thereof may include works in the industrial field or works in the field of physics and chemistry.

The front room 220 or the sub front room 230 has a function of easing the influence from the outside to the main room 210. Here, the front room 220 or the sub front room 230 may be used for various works and acts. Examples of the specific use of the front room 220 include changing clothes by workers engaged in the works and the acts, air-cleaning clothes worn by the workers. Examples of the specific use of the sub front room 230 include carrying out of waste, carrying in and out of tools and equipment used for the works and the acts, and carrying in and out of test pieces, samples, and the like.

The machine room 240 is a space for disposing the air exhaust fan filter units 60a and 60b or an electric parts box 80. The electric parts box 80 stores a power supply used in the clean booth 200 and a control panel unit including a controller for controlling electrical equipment, an operation device for operating the electrical equipment, or the like.

In FIG. 3A, the pressure sensor 90 for measuring the room pressure is installed on the main room 210 side of the wall portions 20 which separate the machine room 240 and the main room 210. The pressure sensor 90 can be used in a case where the rotation speeds of the fans of the air exhaust fan filter units 60a and 60b are controlled to variable speeds.

Here, the position where the pressure sensor 90 is installed is not limited to this position. When the rotation speed is not controlled to the variable speed, the installation of the pressure sensor 90 may be omitted.

In FIGS. 2, 3A, 3B, and 3C, the clean booth 200 is provided to exhibit a flat rectangular parallelepiped hexahedron in the assembled state. Here, in the same manner as in the clean booth 100, the booth main body of the clean booth 200 has an open bottom side, has a ceiling portion and side portions, but does not have a bottom portion. On the bottom side of the booth main body, a floor, a ground, or the like of a location where the clean booth 200 is assembled separates the internal space.

The wall portions 20 that form the internal space provided with the frames 10 include the ceiling portion and the side portions of the main room 210, the ceiling portion and the side portions of the front room 220, or the ceiling portion and the side portions of the sub front room 230. Meanwhile, the bottom sides of the main room 210, the front room 220, and the sub front room 230 do not include the wall portions 20 that are provided with the frames 10 and form an internal space.

As illustrated in FIGS. 2, 3A, 3B, and 3C, the side portion on the front side of the booth main body of the clean booth 200 forms a front wall of the front room 220. The front wall of the front room 220 includes an outer main door 31 that can be opened and closed to allow entry and exit from the front room 220. A rear wall of the front room 220 includes an internal main door 32 that can be opened and closed to allow entry and exit from the main room 210 at a position facing the outer main door 31.

The entry and exit from the main room 210 can be performed mainly in the path passing through the front room 220. When passing through the front room 220, the entry and exit from the main room 210 is basically performed so that the outer main door 31 and the internal main door 32 are not simultaneously opened. These doors may include an interlock function so as not to be simultaneously opened.

The side portion on the front side of the booth main body of the clean booth 200 forms the front wall of the sub front room 230. The front wall of the sub front room 230 includes an outer sub door 33 that is freely opened and closed to allow the entry and exit from the sub front room 230. The rear wall of the sub front room 230 includes an internal sub door 34 that is freely opened and closed to allow the entry and exit from the main room 210 at a position facing the outer sub door 33.

The entry and exit from the main room 210 can be performed on a path passing through the sub front room 230. When passing through the sub front room 230, the entry and exit from the main room 210 is basically performed so that the outer sub door 33 and the internal sub door 34 are not simultaneously opened. These doors may include an interlock function so as not to be simultaneously opened.

The outer main door 31, the internal main door 32, the outer sub door 33, and the internal sub door 34 can be provided in a panel shape, for example, by a synthetic resin material such as an acrylic resin, a lightweight metal material, or the like. In the same manner as the door 14, the doors are provided as external opening hinged doors. In the same manner as in the door 14, the method of attaching the doors can be, for example, a method using an inserting-type hinge.

As illustrated in FIGS. 2, 3A, 3B, and 3C, in an assembled state, the clean booth 200 includes the air supply fan filter units (first units) 50a and 50b and the air exhaust fan filter units (second units) 60a and 60b on the wall portions 20 that form the internal space.

In the same manner as the fan filter units 50 and 60, the fan filter units (FFUs) 50a, 50b, 60a, and 60b are devices that inhale gas, remove dust particles or the like from the inhaled gas, and blow the gas (gas from which the number of dust particles of equal to or more than a predetermined size or the like are reduced) of which the cleanliness is enhanced. In the same manner as in the fan filter units 50 and 60, the fan filter units 50a, 50b, 60a, and 60b include filters that remove dust particles or the like from passing gas, fans that blow gas for supplying or exhausting the air, control devices that control the rotation speed of the fan, or the like.

Air supply fan filter units (first units) 50a and 50b have fans (first fans) that supply the air into the main room 210 (internal space) via built-in filters (first filters). These fan filter units 50a and 50b inhale the air outside the clean booth 200 and discharge the air passing through the filters to the main room 210 (internal space). FIG. 2 schematically illustrates the flow of the air discharged to the main room 210 with arrows.

The air exhaust fan filter units (second units) 60a and 60b have fans (second fans) that exhaust the air in the main room 210 (internal space) to the outside of the main room 210 (internal space) via the built-in filters (second filters). These fan filter units 60a and 60b inhale the air of the main room 210 and discharge the air passing through the filters to the outside of the clean booth 200. FIG. 2 schematically illustrates the flow of the air discharged through the machine room 240 with arrows.

In the clean booth 200, the total exhaust air volume of the air exhaust fan filter units 60a and 60b is controlled to be more than the total air supply flow rate of the air supply fan filter units 50a and 50b. In such a control, the pressure of the main room 210 (room pressure) is adjusted to the negative pressure lower than that of the outside of the clean booth 200, the front room 220, or the sub front room 230. The pressure value of the main room 210 is not particularly limited, as long as the pressure value is lower than the pressure of the outside of the clean booth 200.

The method of controlling the rotation speeds of the fans of the air supply fan filter units 50a and 50b or the air exhaust fan filter units 60a and 60b is the same as the method of the fan filter units 50 and 60. A method of controlling both of the rotation speed of the fan on the air supply side and the rotation speed of the fan on the air exhaust side to the constant speed or the method of controlling the rotation speed of the fan on the air supply side to the constant speed and the rotation speed of the fan on the air exhaust side to a variable speed become preferable methods.

As illustrated in FIGS. 2, 3A, 3B, and 3C, the air supply fan filter units 50a and 50b are preferably disposed on the ceiling portion of the main room 210 or on the upper side of the side portion of the main room 210. Meanwhile, as illustrated in FIGS. 2, 3A, 3B, and 3C, the air exhaust fan filter units 60a and 60b are preferably disposed on the side portion of the main room 210 or on the lower side of the side portion of the main room 210.

In such disposition, the air flows in one direction from the upper side to the lower side of the main room 210. Therefore, while flying up of the dust particles, dangerous substances, contaminants, or the like is suppressed, the room pressure can be adjusted, and the air can be cleaned. The booth main body has a structure in which the bottom side is opened, but if the air flows in one direction from the upper side to the lower side of the main room 210, the intrusion of the dust particles from the outside of the clean booth 200 or the like to the main room 210 can be suppressed.

In the same manner as in the fan filter units 50 and 60, the fan filter units 50a, 50b, 60a, and 60b can be installed in the method of providing a predetermined opening portion by the frames 10. In this clean booth 200, the two air supply fan filter units 50a and 50b and the two air exhaust fan filter units 60a and 60b are controlled at the air supply flow rates or the air exhaust flow rates in the same degree, to form differential pressure essential for the negative pressurization, but may be controlled at air supply flow rates or air exhaust flow rates different from each other.

According to the clean booth 200, the air supply fan filter units 50a and 50b including filters and fans and the air exhaust fan filter units 60a and 60b including filters and fans are easily attached to the assembly-type booth main body. Since the air blows via the filters on the air supply side and the air exhaust side, not only the cleanliness of the air in the main room 210 is secured, but also the leakage of the contaminants to the outside of the booth can be prevented. Since the fans are provided on both of the air supply side and the air exhaust side, highly accurate negative pressure can be stably maintained by controlling these fans and forming a large differential pressure. Since the front room 220 or the sub front room 230 is provided, the influence at the time of entry and exit from the main room 210 is eased. The assembly-type booth main body is easily conveyed, assembled, and disassembled. Accordingly, by the clean booth, a space where the cleanliness is secured and the external contamination is also suppressed can be easily formed.

Subsequently, a specific embodiment of the clean booth according to the present invention is described with reference to the drawings.

The clean booths 100 and 200 can be used for various works and acts without providing an air supply duct or an air exhaust duct. None of the pipes, shafts, hoses, or the like disposed inside the booth main body or the pipes, shafts, hoses, or the like disposed outside the booth main body are required as an air supply duct or an air exhaust duct.

In the clean booths 100 and 200, the air exhaust fan filter units 60, 60a, and 60b including filters are used, the external contamination is also suppressed. Therefore, not only the location for installing the booth main body but also the degree of freedom of the location of the air exhaust increase.

In the case of medical use, examples of the location to install the clean booths 100 and 200 include, indoors of various facilities and buildings or outdoors of various facilities and buildings such as indoors of medical facilities, outdoor of medical facilities, convention halls, stadiums, gymnasiums, parks, and streets. Here, the location for installing the clean booths 100 and 200 is not particularly limited, as long as the room pressure or the cleanliness of the air is secured.

For example, if the clean booths 100 and 200 are used for the treatment or the therapy of an affected person of an infectious disease or the like, the clean booths 100 and 200 can be installed in indoor passageways or the like of medical facilities. The air exhausted from the air exhaust fan filter units 60, 60a, and 60b can be released at the spot. Since the cleanliness of the air exhausted via a filter is secured, an effect of cleaning the outside the clean booths 100 and 200 can be expected. The clean booth 200 is larger than the clean booth 100, and can allow beds, medical equipment, and the like to be housed therein. By installing a large number of the clean booths in a gymnasium or the like, it is possible to easily provide a large number of easy and simple hospital rooms where the inside air is clean and the clean air is discharged from the inside of the clean booth 200 into the gymnasium.

FIG. 4 is a cross-sectional perspective view illustrating an example of the structure of the lower end of the clean booth. FIG. 4 illustrates an example of the configuration of the frames of the base disposed on the lower end of the above assembly-type clean booth.

As illustrated in FIG. 4, the clean booths 100 and 200 each may include a cushioning member 70 on the lower side of the frames 10 of the base disposed on the lower end of the clean booth.

The frames 10 of the base are members that are in contact with the floor, the ground, or the like of the location where the clean booths 100 and 200 are assembled. The cushioning member 70 can be stuck in advance to the surface in contact with the floor, the ground, or the like of the member before the clean booths 100 and 200 are assembled. The cushioning member 70 may be provided on the entire lower surface of the frames 10 of the base and may be provided on a portion of the lower surface, but is preferably provided on the entire lower surface.

Examples of the cushioning member 70 include a closed-cell or open-cell type resin foam such as urethane foam, a resin elastic body such as polyurethane and rubber, a silicone resin, and polyvinyl chloride. Specific examples of the cushioning member 70 include a sponge-shaped resin foam such as moltoprene. The state of the resin may be a gel shape. The cushioning member 70 can be stuck to the frames 10 by an adhesive, a pressure-sensitive adhesive, or the like.

The cushioning member 70 may be contracted by the weight of the booth main body when the clean booths 100 and 200 are assembled and grounded to the floor, the ground, or the like. Therefore, if the floor of the internal space where the room pressure or the cleanliness of the air is adjusted is the floor of the building where the clean booths 100 and 200 are installed, and the cushioning member 70 is provided on the frames 10 that configure the base facing the floor of the building, the gap between the booth main body and the ground surface is filled with the contractable cushioning member 70. Therefore, by using the cushioning member 70, higher airtightness can be secured.

If the floor of the internal space where the room pressure or the cleanliness of the air is adjusted is the ground surface with unevenness of the ground or the like, and the cushioning member 70 is provided to the frames 10 that configure the base facing the ground surface, the gap between the booth main body and the unevenness or the like is filled with the cushioning member 70 that can easily deformed and contracted. Therefore, by using the cushioning member 70, even if there is unevenness or the like on the ground surface, higher airtightness can be secured.

If the ground surfaces of the clean booths 100 and 200 are flat, the cushioning member 70 does not necessarily have to be provided. When the clean booths 100 and 200 are installed, if the flat ground surface can be secured, the frames 10 of the base can be disposed to adhere to the ground surface. Here, a clean mat or the like may be laid on the bottom side of the booth main body of the clean booths 100 and 200.

FIG. 5 is a block diagram illustrating an example of the configuration of a power supply of the clean booth. FIG. 5 illustrates an example of the configuration of the power supply provided in the above assembly-type clean booth.

As illustrated in FIG. 5, the clean booths 100 and 200 each may include a direct current power supply unit 82 as a dedicated power supply for driving the fan filter units 50, 50a, and 50b or the like.

The direct current power supply unit 82 is converted from an alternate current power supply 81. The direct current power supply unit 82 includes processing circuits for transforming the voltage of the alternate current power supply 81 by a transformer or a switching element, rectifying processing, smoothing processing, direct current conversion processing, and the like. As the alternate current power supply 81, for example, a commercial power supply having a voltage of 100 to 240 V and a frequency of 50 Hz or 60 Hz can be used. In addition to the direct current power supply unit 82, the alternate current power supply 81 can be distributed to other electrical equipment included in the clean booths 100 and 200.

The direct current power supply unit 82 is distributed to dedicated air supply FFU power supply units 83 included in the air supply fan filter units 50, 50a, and 50b, and dedicated air exhaust FFU power supply units 84 included in the air exhaust fan filter units 60, 60a, and 60b. The direct current power supply unit 82 preferably includes a power supply circuit of a free power supply having a wide allowable range of input voltage.

In order to control the air flow rate on the air supply side, the air supply FFU power supply unit 83 supplies power to an air supply unit controller 85. The air supply unit controller 85 includes power supply circuits for driving the air supply fan filter units 50, 50a, and 50b and control circuits for outputting instructions to control the rotation speed of the fans of the air supply fan filter units 50, 50a, and 50b.

Meanwhile, the air exhaust FFU power supply unit 84 supplies power to an air exhaust unit controller 86. The air exhaust unit controller 86 includes power supply circuits for driving fan motors of the air exhaust fan filter units 60, 60a, and 60b and control circuits for outputting instructions to control the rotation speed of the fans of the air exhaust fan filter units 60, 60a, and 60b. The air exhaust FFU power supply unit 84 is configured to supply power to the pressure sensor 90.

If the configuration of the power supply is provided, after the assembly of the clean booths 100 and 200, the adjustment of the room pressure can be started only by starting to supply power to the alternate current power supply 81. It is advantageous for a control method in which both the rotation speed of the air supply side fan and the rotation speed of the exhaust side fan are controlled to a constant speed. It is possible to use a plug-in connector of a dedicated power supply around the installation location of the clean booths 100 and 200. According to the usage method, no special wiring is required, and thus the user can easily set up the negative pressure chamber.

FIG. 6 is a diagram illustrating a relationship between the rotational speed of the fan of the fan filter unit and the differential pressure formed by the fan. In FIG. 6, the vertical axis represents the rotation speed N* of the fan of the fan filter unit, and the horizontal axis represents a differential pressure $\Delta P$ [Pa] formed by the fan. The solid line presents a characteristic line of the air supply fan filter unit, and the broken line represents a characteristic line of the air exhaust fan filter unit.

FIG. 6 illustrates an example in which the rotation speeds of the fans of the air supply fan filter units 50, 50a, and 50b are set to the constant speed, and the rotation speeds of the fans of the air exhaust fan filter units 60, 60a, and 60b are set to the variable speed, as an example of the method of controlling the rotation speed of a fan.

The control example illustrated in FIG. 6 corresponds to a case where the unit controllers 86 of the air exhaust fan filter units (second units) 60a and 60b output instructions to the fans (second fans) of the air supply fan filter units 50, 50a, and 50b so that the flow rate of the air exhausted by the fans (second fans) of the air supply fan filter units 50, 50a, and 50b is higher than the flow rate of the air supplied by the fans (first fans) of the air exhaust fan filter units 60, 60a, and 60b.

As illustrated in FIG. 6, if the rotation speed of the fan on the air supply side is set to the constant speed, it is possible to maintain a substantially constant air supply flow rate as the internal space. If the rotation speed of the fan on the air exhaust side is set to the variable speed, the air exhaust flow rate from the internal space is adjusted under the substantially constant air supply flow rate by the fan on the air supply side. The air exhaust flow rate from the internal space is adjusted so that the differential pressure by the air supply and the air exhaust converges to the target value of the negative pressure after the pressure is converted from positive pressure to negative pressure. By such a control method, the negative pressure formed in the internal space is controlled to the target value while the occurrence of the hunting phenomenon is prevented.

Although the embodiments of the present invention are described above, the present invention is not limited to the above embodiments, and various modifications are included without departing from the technical scope. For example, the above embodiments are not limited to those necessarily having all the configurations described. It is possible to replace a part of the configuration of a certain embodiment with another configuration or add another configuration to the configuration of a certain embodiment. It is possible to add another configuration, delete a configuration, or replace a configuration with respect to a part of the configuration of a certain embodiment.

For example, the clean booths 100 and 200 are provided so as to exhibit a hexahedron in the assembled state. However, the clean booth according to the present invention may be provided with an appropriate shape and an appropriate length, width, height, and the like. As long as an internal space where the pressure is adjusted to the negative pressure is provided, the booth main body may include one or any number of rooms and any number of opening portions or doors for entry and exit.

The booth main bodies of the clean booths 100 and 200 are formed by combining the plurality of frames 10, and mainly completed by bases, pillars, and beams. However, dimensions, combinations, mutual assembling, and the like of the frames 10 in the clean booth according to the present invention are not particularly limited. For example, pillars may be disposed inside the booth main body, and multi-level beams having different height may be disposed above the base.

The clean booths 100 and 200 include one or two air supply fan filter units and one or two air exhaust fan filter units. However, installation numbers of the air supply fan filter units or the air exhaust fan filter units are not particularly limited. As long as the internal space is adjusted to negative pressure, the number of units on the air supply side and the number of units on the air exhaust side may be the same or different from each other.

The cushioning member 80, the direct current power supply unit 82, the air supply FFU power supply unit 83, the air exhaust FFU power supply unit) 84, the air supply unit controller 85, and the air exhaust unit controller 86 may be included in the clean booths 100 and 200 or any one with a similar form.

REFERENCE SIGNS LIST

10: frame
11: base member
11a: vertical base member
11b: horizontal base member
12: pillar member
12a: pillar member
12b: column member
13: beam member
13a: vertical beam member
13b: horizontal beam member
13c: intermediate beam member
14: door
15: unit support member
16: unit connection member
20: wall portion
31: outer main door
32: internal main door
33: outer sub door
34: internal sub door
50, 50a, 50b: air supply fan filter unit (first unit)
60, 60a and 60b: air exhaust fan filter unit (second unit)
70: cushioning member
80: electric parts box
81: alternate current power supply
82: direct current power supply unit
83: air supply FFU power supply unit
84: air exhaust FFU power supply unit
85: air supply unit controller
86: air exhaust unit controller
90: pressure sensor
100: clean booth
200: clean booth
210: main room (internal space)
220: front room
230: sub front room
240: machine room

The invention claimed is:

1. A clean booth in an assembled state, comprising:
frames which constitute a base, a pillar, and a beam;
a wall portion that is provided between the frames and forms an internal space;
a first unit that is provided on the wall portion and includes a first fan that supplies air to the internal space via a first filter; and
a second unit that is provided on the wall portion and includes a second fan that exhausts the air in the internal space outside the internal space via the second filter, wherein
a floor of the internal space is a floor of a building on which the clean booth is grounded,
a cushioning member is provided to the frames which constitute the base opposed to the floor of the building,
the first unit is provided on a wall portion positioned on an upper side of the internal space,
the second unit is provided on a wall portion positioned on a side of the internal space,
the frame arranged in an upper part of the internal space includes a column member arranged between pillar members, a first beam member supported by the pillar members, a second beam member supported by the column member, and a pair of support members arranged in parallel and separate from each other and fixed to the first beam member and the second beam member, and
the first unit is fixed to the pair of support members.

2. The clean booth according to claim 1,
wherein the second unit includes a unit controller that outputs an instruction to the second fan, and
the unit controller outputs an instruction to the second fan so that a flow rate of the air exhausted by the second fan is more than that of the air supplied by the first fan, and wherein
a rotational speed of the first fan is controlled to be constant.

3. The clean booth according to claim 1, wherein
hook and loop fasteners are provided to the wall portion and the frame which is in contact with the wall portion, and wherein
the wall portion is detachable from the frame which is in contact with the wall portion.

* * * * *